(12) United States Patent
Majko

(10) Patent No.: US 8,037,066 B2
(45) Date of Patent: Oct. 11, 2011

(54) SYSTEM AND METHOD FOR GENERATING TAG CLOUD IN USER COLLABORATION WEBSITES

(75) Inventor: Alfred E. Majko, Crystal Lake, IL (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/015,076

(22) Filed: Jan. 16, 2008

(65) Prior Publication Data

US 2009/0182727 A1 Jul. 16, 2009

(51) Int. Cl.
*G06F 17/30* (2006.01)
(52) U.S. Cl. ........................................ 707/734
(58) Field of Classification Search ............ None
See application file for complete search history.

(56) References Cited

U.S. PATENT DOCUMENTS

| | | |
|---|---|---|
| 2002/0173971 A1 | 11/2002 | Stirpe et al. |
| 2004/0083191 A1 | 4/2004 | Ronnewinkel et al. |
| 2006/0235984 A1 | 10/2006 | Kraus et al. |
| 2007/0078889 A1 | 4/2007 | Hoskinson |
| 2008/0010615 A1* | 1/2008 | Curtis et al. ............ 715/846 |
| 2008/0059897 A1* | 3/2008 | DiLorenzo ............... 715/764 |
| 2008/0071929 A1* | 3/2008 | Motte et al. ............. 709/246 |
| 2008/0072145 A1* | 3/2008 | Blanchard et al. ...... 715/273 |
| 2008/0092054 A1* | 4/2008 | Bhumkar et al. ........ 715/739 |
| 2009/0070852 A1* | 3/2009 | Chijiiwa et al. ........... 726/1 |

* cited by examiner

*Primary Examiner* — Neveen Abel Jalil
*Assistant Examiner* — Kellye Buckingham
(74) *Attorney, Agent, or Firm* — Anna Linne; Roberts Mlotkowski Safran & Cole, P.C.

(57) ABSTRACT

A system and method for searching a collaborative website and displaying one or more words in a tag cloud. The system includes a search engine structured to search a collaborative website and a tag cloud generator configured to produce a tag cloud, which includes one or more words associated with one or more documents and configured to be weighted or scored according to importance within an online community, and based on a search term entered into the search engine. The method includes scoring one or more words within the collaborative website and displaying the one or more words via a tag cloud according to the score.

23 Claims, 6 Drawing Sheets

Parsed and Scored Wiki-Words

Search: Primary Election 2008 ← 210

| Word | Webpage/URL | Parsing Relevance | Number of times accessed | Number of links to webpage | Webpage score | Aggregate word score |
|---|---|---|---|---|---|---|
| Primary | Webpage 1 | .74 | 14 | 2 | 34 | 51 |
| | Webpage 245 | .54 | 671 | 44 | 48 | |
| | Webpage 337 | .87 | 1 | 0 | 12 | |
| Election | Webpage 248 | .22 | 2124 | 15 | 50 | 75 |
| | Webpage 86871 | .91 | 34527 | 211 | 84 | |
| 2008 | Webpage 245 | .54 | 671 | 44 | 48 | 34 |
| | Webpage 24 | .33 | 4 | 1 | 5 | |
| | Webpage 9711 | .94 | 54 | 21 | 25 | |

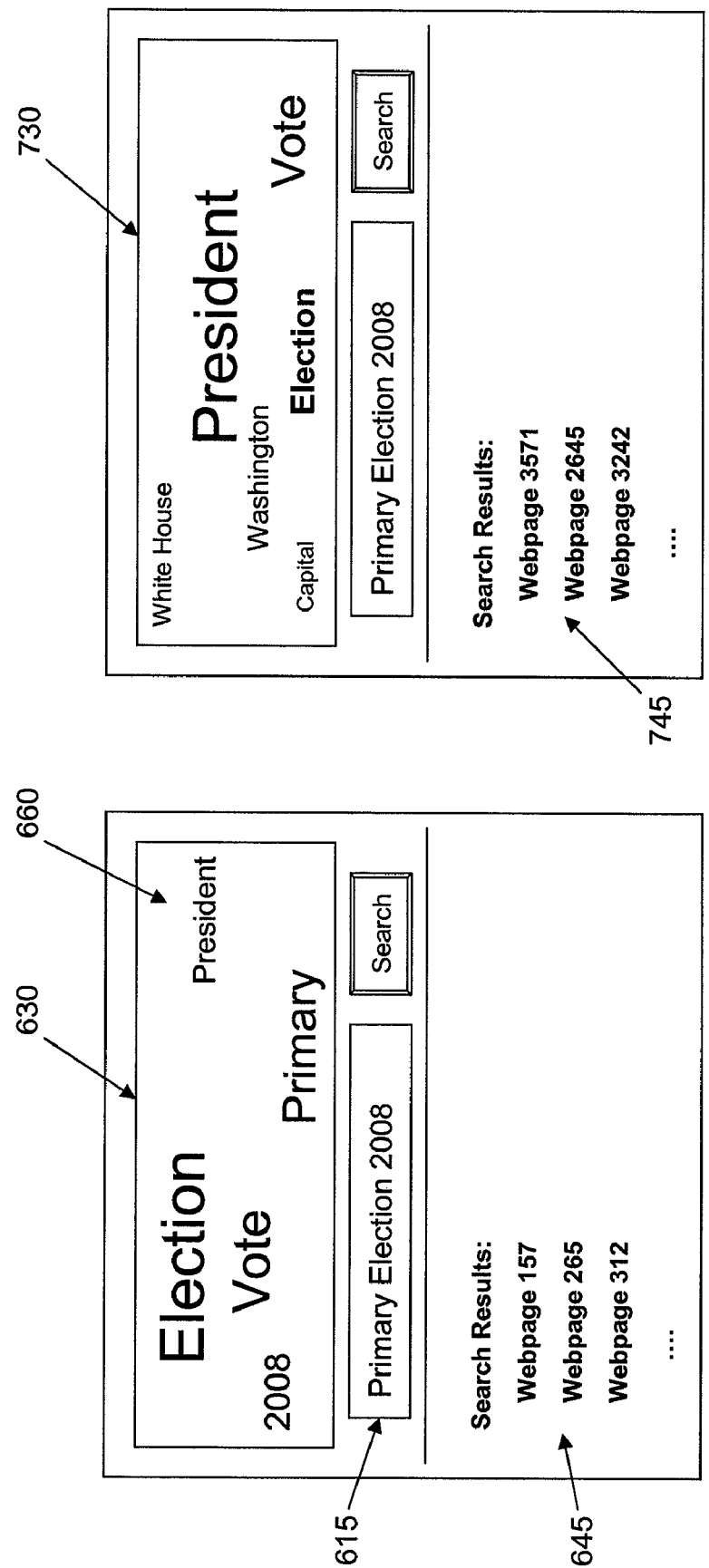

SYSTEM AND METHOD FOR GENERATING TAG CLOUD IN USER COLLABORATION WEBSITES

FIELD OF THE INVENTION

The invention generally relates to a system and method for searching a collaborative website and, more particularly, to searching a collaborative website and displaying one or more words in a tag cloud.

BACKGROUND OF THE INVENTION

The world wide web (web) has become an important tool used throughout the world. One particular advantage of the web is that it allows users throughout the world to interact with one another via collaborative websites. Collaborative websites, such as wikis, allow anyone within an online community to edit content within a collaborative website. A wiki, in particular, is a software engine that may be used to create a collaborative website and/or power community websites, whereby users can easily create, edit, and/or link webpages within the wiki. Additionally, users may also create new content for the collaborative website and/or link to content within the collaborative website.

Collaborative websites can be searched using a search engine. Search engines typically use a web spider to parse data and then rank webpages based on how many search terms appear within a webpage and the proximity of the words within the webpage. The data is then presented in a list to users, where the webpages with the most similarity to the search term are listed first. However, while the results may include the search term, the results may not adequately represent the most relevant webpages within an online community. This is because the search engine ranks webpages according to a predefined algorithm, instead of allowing users to determine what webpages are most important. Additionally, the search engine displays the results over one or more pages, which often requires users to go through multiple pages of results before finding an important, or popular, webpage within the online community.

For example, a user searching for "pop" (i.e., a carbonated beverage) using a standard search engine will be presented with a number of webpages relating to "pop music", whereas the user really was searching for "pop" as another way to refer to "soda". Since all of the webpages display "pop music" as most relevant, the user will have to search through the webpages to eventually get to webpages about "soda", if such webpages are even found by a traditional search engine. This is frustrating for users that may not know synonyms for their search terms, or have to search through multiple pages of irrelevant search results before finding a relevant webpage. This inability to find relevant webpages is particularly frustrating when navigating collaborative websites where users are supposed to be able to easily contribute to, and interact with, an online community.

Accordingly, there exists a need in the art to overcome the deficiencies and limitations described hereinabove.

SUMMARY OF THE INVENTION

In a first aspect of the invention, a system comprises a search engine structured to search a collaborative website and a tag cloud generator configured to produce a tag cloud, which includes one or more words associated with one or more documents and configured to be weighted or scored according to importance within an online community, and based on a search term entered into the search engine.

In another aspect of the invention, a method for scoring one or more words within the collaborative website and displaying the one or more words via a tag cloud according to the score.

A further aspect of the invention, a computer program product comprises a computer usable medium having readable program code embodied in the medium, the computer program product includes at least one component to: display one or more words in a tag cloud, whereby the one or more words are associated with a collaborative website; and visually adjust the one or more words according to a score or a weight.

In yet another aspect of the invention, a method for deploying an application for web searching includes providing a computer infrastructure being operable to: generate search results; and display one or more words in a tag cloud based on a score calculated at least in part from the search results, whereby the one or more words are associated with one or more documents within a collaborative website.

BRIEF DESCRIPTION OF THE DRAWINGS

The present invention is described in the detailed description which follows, in reference to the noted plurality of drawings by way of non-limiting examples of exemplary embodiments of the present invention.

FIG. 3 illustrates an exemplary system for assigning a score/weight to one or more words in accordance with the invention;

FIG. 7 illustrates a collaborative website's graphical user interface (GUI) having a tag cloud in accordance with the invention; and FIG. 8 illustrates a GUI after a word has been chosen from a tag cloud in accordance with the invention.

DETAILED DESCRIPTION OF EMBODIMENTS OF THE INVENTION

The invention is directed to a system and method for searching a collaborative website and displaying one or more words in a tag cloud. A tag cloud is a stylized way of visually representing occurrences of words used to describe tags. A tag is an html-encoded link in a webpage that can be accessed using any number of web browsing applications. Accordingly, the invention relates to using a search engine to obtain search results within a collaborative website and displaying the results of the search via a tag cloud, wherein words within the tag cloud are presented according to their importance or popularity within the online community.

The importance of a word within an online community, and its visual depiction in a tag cloud, is determined using a results generator. A results generator may be used to search one or more words that have been assigned to a webpage. Words are assigned to a webpage by users within an online community, whereby a user assigns one or more words to a webpage to describe the webpage's content.

Once one or more user assigned words are obtained from the search, they may be scored/weighed according to their pertinence and popularity within the online community. This scoring/weighing process may be done using a click through rate, counting the number of times a webpage is referenced, determining the relevance of the one or more documents associated with the one or more words, etc. After being scored/weighed, the user assigned words are presented to the user via a tag cloud, wherein the word's visual appearance within the tag cloud indicates the importance of the word within an online community given the user's search query. The more frequently a word appears in the search results, is clicked on, etc., the higher the weight assigned to the word, and the more predominate the user assigned word appears in the tag cloud.

Since a tag cloud is generated in real-time, the appearance of one or more words within a tag cloud may change each time a search is performed, e.g., as a word becomes more or less popular based on an increased or decreased word score/weight. Additionally, tag clouds may also be created automatically when a user enters a collaborative website without requiring a user to first enter a search query. In these instances, the generated tag cloud may depict the words within the collaborative website having the highest score/weight associated with the words.

Once a tag cloud is created from the user assigned words, a user may select a word from the tag cloud, wherein the word is hyperlinked or otherwise connected to the search results. The selection of a word may further be used to create a new tag cloud, generate a new search result with webpages having the user assigned word, etc.

System Environment

Figure 1:
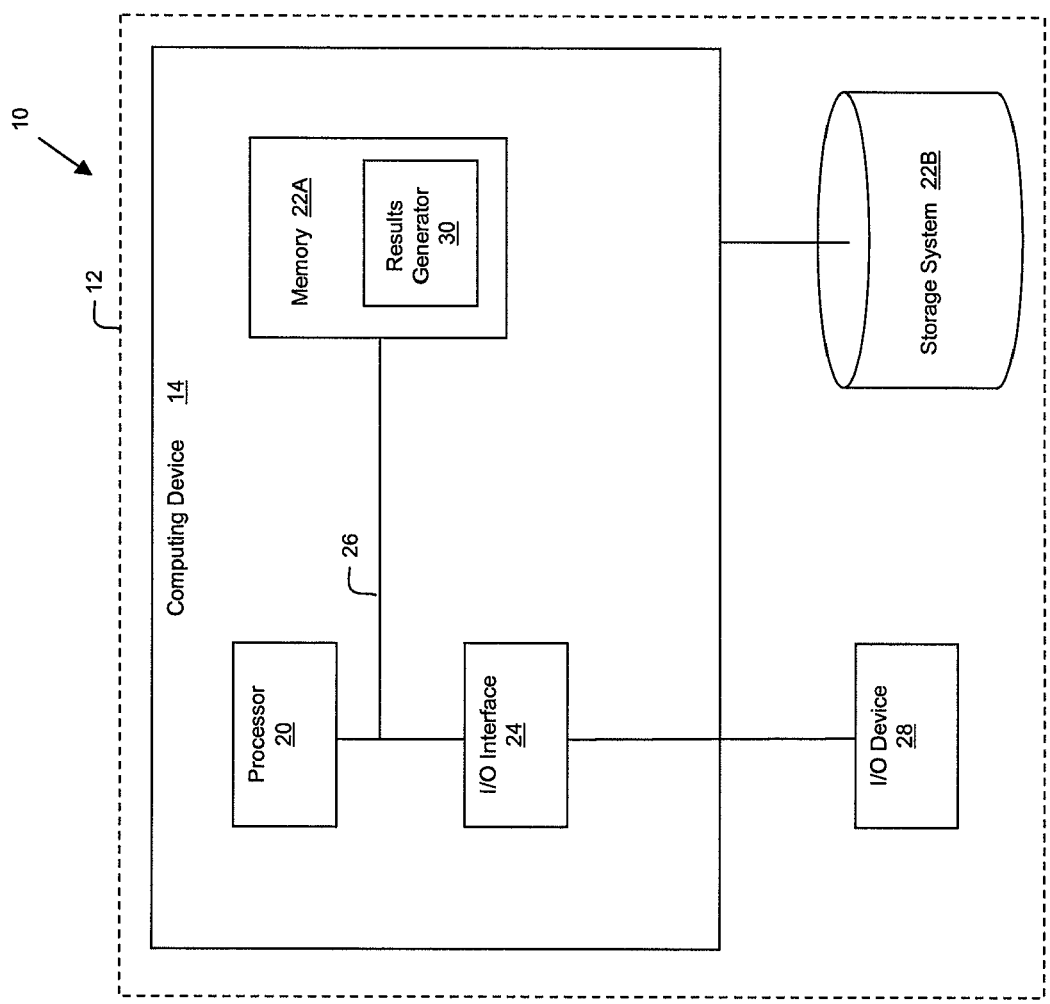
FIG. 1 shows an illustrative environment for implementing the steps in accordance with the invention.

FIG. 1 shows an illustrative environment 10 for managing the processes in accordance with the invention. To this extent, the environment 10 includes a server 12 that can perform the processes described herein. In particular, the server 12 includes a computing device 14 that comprises a results generator 30, which makes computing device 14 operable to generate a tag cloud having one or more user assigned words within the tag cloud, wherein the user assigned words may be visually distinguishable from one another and connected to the search results, e.g., via a hyperlink.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28 and a storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, etc.

In general, the processor 20 executes computer program code, which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Results Generator

Figure 2:
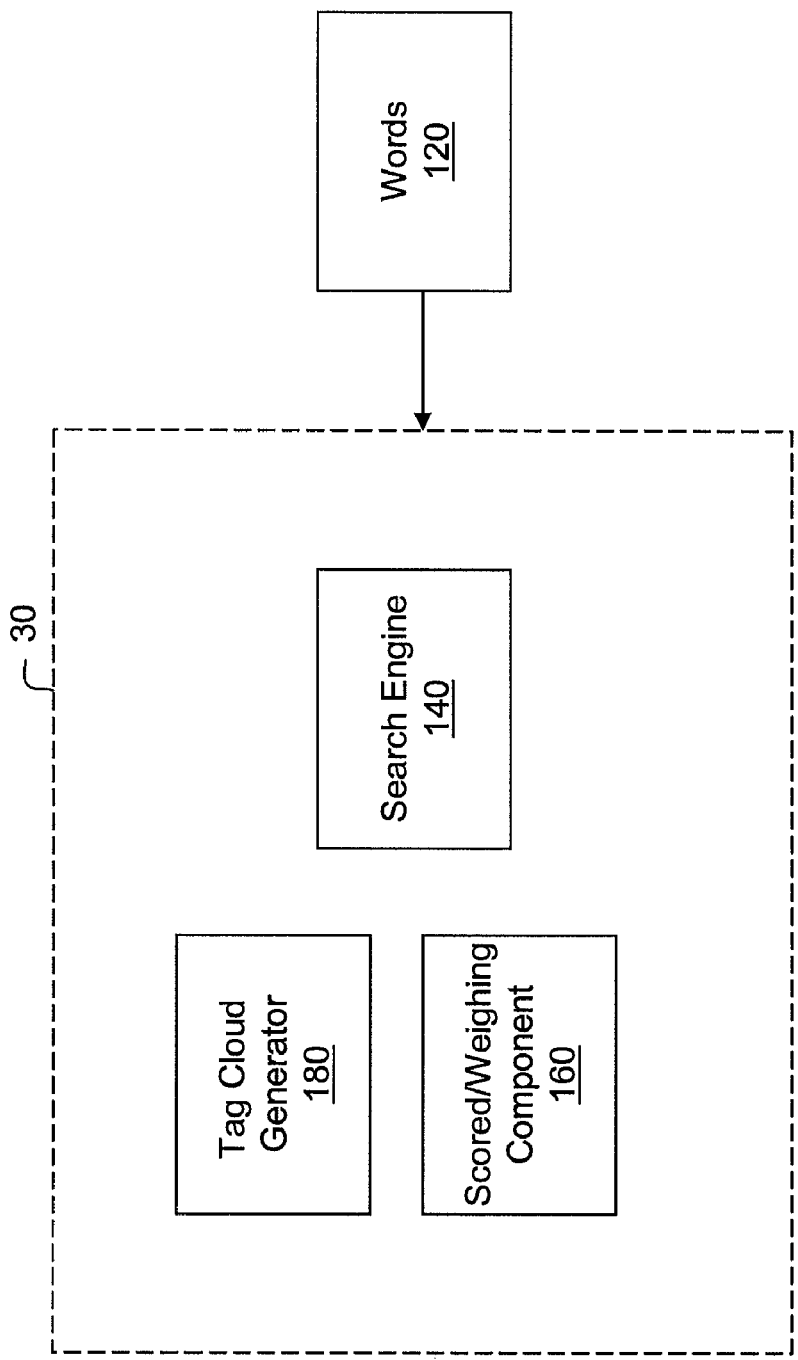
FIG. 2 illustrates a high level block diagram of a results generator in accordance with the invention.

FIG. 2 illustrates a high level diagram of a results generator 30 in accordance with an aspect of the present invention. The results generator 30 is configured to produce search results via a tag cloud according to the popularity of words 120 within a collaborative website, wherein the popularity can be measured via a number of factors including a score/weight of a word. The results generator 30 includes a search engine 140, a scoring/weighing component 160, and a tag cloud generator 180 configured to present one or more scored/weighed words to a user in a tag cloud.

Each webpage within a collaborative website may be described by users within an online community. The users may describe these webpages using one or more words 120, which the users believe represent the webpage. These user assigned words 120 may be added, deleted, and/or edited by any member of the online community, or alternatively by a select few members and/or administrators. These words 120 may be stored in a webpage's metadata, text file, database, etc. Additionally, while the total number of words 120 associated with a webpage may be unlimited, embodiments may limit the number of words 120 that may be used to describe a webpage according to a predetermined threshold.

When a user searches a collaborative website for a webpage, the user may do so by entering a search query and having a search engine 140 search the user assigned words 120 to find the most relevant webpages given the search query. This may be done using a parsing algorithm to parse the text, e.g., a text file using any token separator (e.g. " " for words, "/" for branches of links, "?" for common gateway interface-binary (cgi-bin) actions, etc.). While the search engine searches webpages, embodiments may keep track of the words 120 used by users to describe the relevant webpages. The importance or popularity of each of these words 120 can be determined via a scoring/weighing component 160, which may be performed during or after the words 120 have been searched.

The scoring/weighing component 160 is configured to assign a score to words 120 encountered while searching for a search query, and weigh the importance of each word 120. The score/weight is representative of how important or popular a user assigned word 120 is within the collaborative website. Embodiments may score/weigh more important words higher by giving the word 120 a higher numerical value, or alternatively, embodiments may rank each word in order of importance. Any number of factors may be considered when scoring/weighing the words 120, such as the click through rate of the associated webpage, the number of times the word or associated webpage is referenced, the relevance of the webpages associated with the one or more user assigned words, etc. Once the words 120 are scored/weighed, the words may be presented to the user via a tag cloud generator 180.

The tag cloud generator 180 is configured to present the words 120 associated with the relevant webpages to a user via a tag cloud. The tag cloud displays the user assigned words 120 differently within the tag cloud based on their importance or popularity within the online community, e.g., the score/weight associated with the word. For example, embodiments may change the size, color, font, location, etc., of a word 120 to indicate to a user the importance of the word 120 given the user's search query. Hence, a user presented with a word 120 in red Arial 24 point bold font can infer the word is more important than a word presented in black Times New Roman 12 point font. Each of the words in the tag cloud may be further hyperlinked, or otherwise connected, to the search results such that a user can select any of the words in the tag cloud and obtain search results relating to the selected word.

Scoring/Weighing Component

FIG. 3 is an exemplary system for assigning a score/weight to one or more words in accordance with the invention. More specifically, FIG. 3 illustrates some of the factors that may be considered when determining a score/weight to assign to a word 220 within a collaborative website. These factors include a parsing relevance 240, the number of times a webpage has been accessed 250, and the number of times other webpages link to a webpage 260 described by the word 220. By considering these factors, a webpage score 270 and an aggregate word score or weight 280 can be calculated and subsequently used to determine which user assigned words should appear in a tag cloud and how each word should appear in the tag cloud.

In FIG. 3, a user may enter a search query, such as "Primary Election 2008", in a search field 210. Once a search query is entered, a search engine searches one or more webpages within a collaborative website, as shown in column 230. During this searching process, for example, the search engine may parse a webpage's metadata to determine what words, as shown in column 220, have been associated with the webpage according to members of the online community. If the webpage's metadata has words that are related to the search query, then the related words, as well as the other words in the metadata, may be stored in a database, table, or using another data structure. Embodiments may allow each new instance of a word to be added to the data structure, whereas subsequent instances of a word may be tracked using a counter, keeping track of each webpage having the word, and/or a variety of other processes. For example, the embodiment illustrated in FIG. 3 keeps track of words by listing each new instance of a word in a table and listing all of the webpages in column 230 having the word.

Embodiments may also keep track of additional factors besides words and the webpages that are described by the words 220. For example, information on each webpage may be kept in order to compute a score for each webpage in a column 270, wherein the webpage score is indicative of the popularity, or importance, of the webpage within an online community. Embodiments may use the importance of a webpage within an online community to score/weigh the importance of the words used to describe the webpage. Factors that may be used to determine the importance of a webpage, e.g., a webpage score at column 270, include a parsing relevance, which is used to determine how relevant a webpage is to a search query.

Additional factors such as the number of times a webpage has been accessed as shown in column 250 by one or more users within an online community, e.g., a click through rate, may also be considered when determining a webpage score as shown in column 270. The more frequently a webpage is accessed, the more important, or popular, the webpage is within the online community. Since webpages having a high number of accesses are likely to be relevant to users within the collaborative website, these webpages will have a positively affected webpage score as shown in column 270. A positively affected webpage score may have a positive affect when determining an aggregate word score shown in column 280, which is used to determine the visual appearance of a word within a tag cloud.

Another factor that may be considered when determining a webpage score is the number of times one or more webpages have been linked to. Generally, a webpage is linked to when the webpage includes relevant information on an issue within the online community. Therefore, a webpage having a high number of links, as shown in column 260, is likely to be important to a number of members in the online community. The more times a webpage is linked to, the higher the webpage score, and the higher the aggregate word score as shown respectfully in columns 270 and 280. This, in turn, is used to determine the visual appearance of a word within a tag cloud. However, if one or more webpages remove their links to a webpage, then the webpage score may be decreased based on the inference that the webpage is less reliable and/or important since fewer users are linking to it.

Additional factors not illustrated in FIG. 3 may also be used to determine how popular a webpage is within an online community, and consequently used to calculate an aggregate word score to be used when creating a tag cloud. For example, embodiments may track the date a webpage was last accessed, how many times a webpage has been edited, when a webpage was created, the number of times a word appears in a webpage's metadata, as well as a number of additional factors.

The factors used to determine a webpage score may be combined in a predetermined way such as weighing all factors equally, unequally, and/or giving no weight to one or more of the factors. The result of this weighing process is a webpage score, which indicates how relevant a particular webpage is to a user's search query. The webpage score may be used to order and display webpages to a user as search results in a list. Additionally, the webpage score may be used to calculate an aggregate word score, which may then be used to determine the visual appearance of a user assigned word within a tag cloud.

An aggregate word score (shown in column 280) may be calculated in a number of ways. For example, embodiments may calculate an aggregate word score by combining all of the webpage scores having a user assigned word. The aggregate word score may also be calculated by averaging all of the webpage scores associated with a user assigned word. Alternatively, embodiments may assign a word a portion of a webpage's score based on the number of times the word appeared in the webpage's text file, the percentage of the text file in which the word appeared, or even a flat numerical value for each webpage a word is used to describe. Embodiments may employ any number of other scoring/weighing schemes to determine an aggregate word score. Once an aggregate word score is calculated, it can be used to rank how important a word is within an online community. The importance of a word may be portrayed to a user via a tag cloud, wherein visual differences between one or more user assigned words within the tag cloud are indicative of different levels of importance within the online community.

For example, in FIG. 3, webpages "1", "245", and "337" all contain the same word "Primary". Therefore, any or all of the webpage scores associated with these webpages may be used to determine an aggregate word score for the word "Primary". A similar process can be repeated for other words that are associated with one or more webpage results. For example, webpage "245" also contains the word "2008". Therefore, the webpage score for webpage "245" may also be considered when calculating the aggregate word score for the word "2008".

It should be understood by those skilled in the art that there are many variations that may be used to calculate an aggregate word score. For example, embodiments may allow only those words that are most frequently used to describe a webpage to utilize the webpage's score to calculate an aggregate word score. Additionally, the number of aggregate word scores calculated may be limited according to a predetermined criteria.

Figure 4:
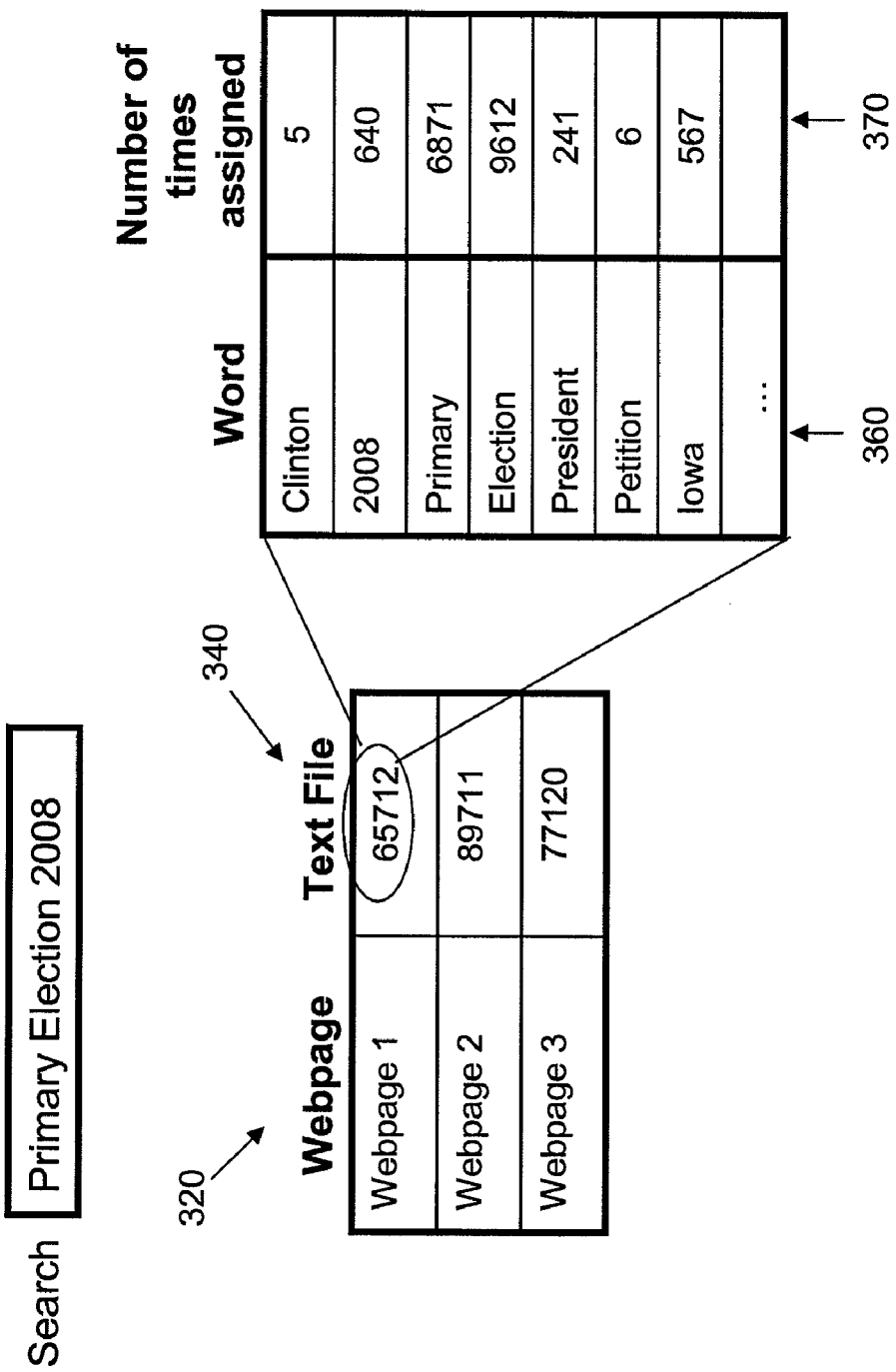
FIG. 4 illustrates an example of how one or more words may be associated with a webpage in accordance with the invention.

FIG. 4 illustrates an embodiment of the parsing relevance factor described in FIG. 3. When using a search engine, the search engine typically parses one or more webpages 320 to obtain words 360 that are related to the search query. This can be done by parsing a text file 340, metadata, database, etc., containing one or more words 360 that are associated with a webpage. During the parsing process, it is also possible to determine how many times a word occurs in a text file (see column 370) and/or the location of a word relative to other words within a text file. The number of times a word appears within a text file is indicative of the number of times one or more users have associated the word to a webpage. This information may be kept by listing a word each time the word is added by a user, or alternatively by totaling the number of times a word is associated with a webpage. Based on all of this parsing information, a parsing relevance may be assigned to the webpage, which can be used when calculating a webpage score.

Tag Clouds

Figure 6:
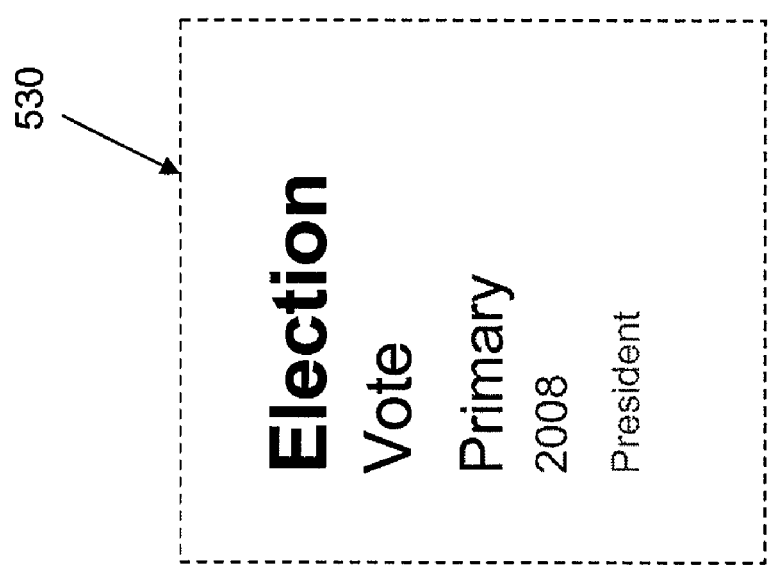
FIG. 6 illustrates another embodiment of a tag cloud in accordance with the invention.
Figure 5:
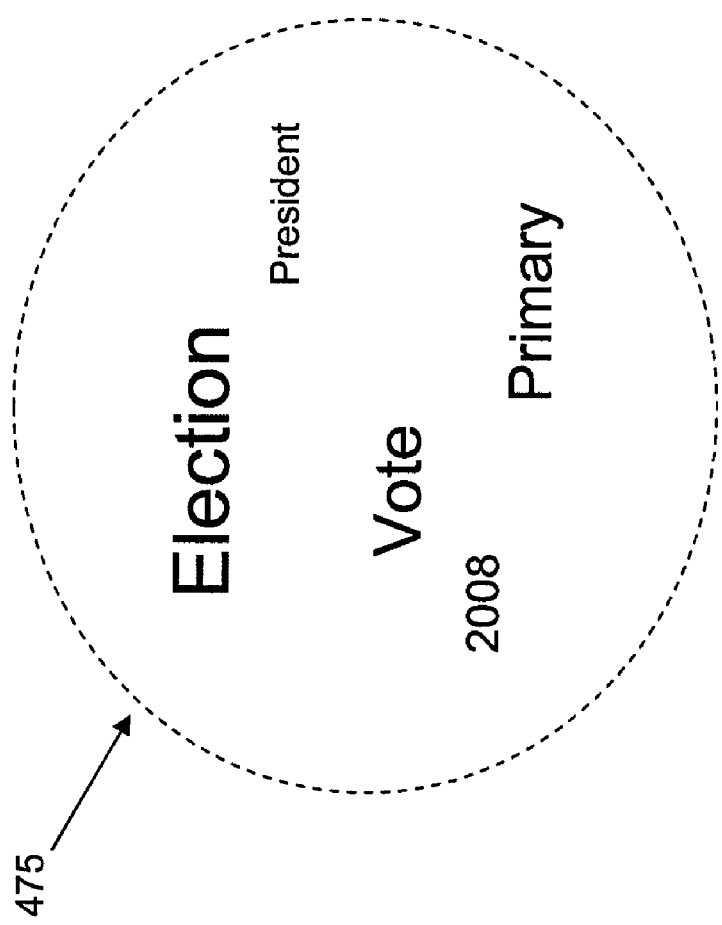
FIG. 5 illustrates an embodiment of a tag cloud in accordance with the invention.

FIGS. 5 and 6 illustrate embodiments of a tag cloud according to an aspect of the invention. As discussed above, a tag cloud is a stylized way of visually representing occurrences of words used to describe tags. A tag is an html-encoded link in a webpage that can be accessed using any number of web browsing applications. Therefore, a tag cloud is a way to graphically report search results by presenting graphical linkable words to a user, whereby the linking may be done via hyperlink or other mechanism. The words within the tag cloud are configured to be scored/weighed to emphasize the relative importance or popularity of the user assigned words within an online community. In addition to changing the size, color, font, etc., of a word in a tag cloud, embodiments may also change the location of words within a tag cloud to illustrate the importance of one or more words within the tag cloud. For example, embodiments may place words that appear together in many webpages close together, whereas words that are associated with one another less frequently may be placed further apart. Words appearing in a tag cloud may be hyperlinked or otherwise connected to a list of search results, whereby a user can click on a word appearing in the tag cloud and be directed to one or more webpages that have been described using the word by members of the online community. This may increase its importance or predominance in the tag cloud.

For example, in FIG. 5, a tag cloud 475 is used to graphically present words that are related to a user's search query. In embodiments, the more important a word is, the larger the word appears in the tag cloud 475. Therefore, the most important word in FIG. 5 is "Election" and the least important word is "President". Additionally, since the words "Election" and "President" are close to each other, it is indicative to a user that the words are related to one another. Similarly, the words "Vote" and "2008" may also be related based on their proximity to each other in the tag cloud 475.

FIG. 6 illustrates another embodiment for presenting words to a user via a tag cloud 530. More specifically, FIG. 6 lists the most important words first in a large bold size, whereas the less important words are listed toward the bottom of the list and muted. Therefore, the most important word in FIG. 6 is "Election" and the least important word in FIG. 6 is "President". This indicates to a user that the word "Election" is weighed/scored higher than "President" and is therefore more likely to be relevant to the user's search query.

The tag clouds illustrated in FIGS. 5 and 6 depict only a few of the many different embodiments that may be used to graphically present search results to a user. For example, additional tag clouds may be created by varying the size, color, font, location, etc., of the words within the tag cloud. Tag clouds may also be formed having any number of boundaries ranging from a square or circle to an entire user's screen. In addition to variations in the appearance of a tag cloud, it should also be understood that the number of words displayed in the tag cloud may be increased or decreased by an administrator or by a user.

Graphical User Interface (GUI)

FIGS. 7 and 8 are illustrative of a GUI used to present one or more words to a user via a tag cloud in accordance with an aspect of the invention. It should be understood that the GUI illustrated in FIGS. 7 and 8 is simplified for explanatory purposes and does not show all of the features of the invention. For example, the GUI does not show the features of adding one or more words to describe a webpage, ranking a webpage, or navigating between webpages.

FIG. 7 illustrates a GUI having a tag cloud 630, wherein the tag cloud 630 includes weighed/scored words 660 based on a user's search query, or alternatively, includes words 660 related to the most popular topics within the collaborative website regardless of an initial search query.

When a user first encounters the GUI, a tag cloud 630 may already be created which shows the most popular words 660 based on the score/weight of the words 660 in the collaborative website. The score/weight of the user assigned words 660 in the initial tag cloud may be calculated based on the popularity of a word 660 within the last hour, day, or week. Embodiments may also employ additional methods for determining which user assigned words 660 to display in the initial tag cloud 630, and subsequently load the initial tag cloud automatically as part of a Perl-based HTTP response footer.

The tag cloud 630 may also be created based on a user's search query. For example, a user may enter a collaborative website and enter a search query into a search field 615. A search engine searches the collaborative website for search results based on the search query. These search results may then be presented to a user via a tag cloud 630 and as a list of webpages 645. Therefore, a user entering the search query "Primary Election 2008" may obtain the tag cloud 630, which includes scored/weighed words 660 that have been assigned by users such as "Election", "Vote", "Primary", "President", and "2008". Additionally, the search results may be presented to a user by listing the most relevant webpages "157", "265", and "312" given the user's search query.

Since the collaborative website's knowledgebase is continually developing, user assigned words 660 may be frequently added, edited, and/or deleted from a webpage (which affects the score/weight of a word in a tag cloud) it should be understood that a user performing the same search two times in a row may obtain slightly different results. In fact, the tag cloud 630 may be changed any time a user enters a new search, refreshes a page, or even selects a word within a tag cloud 630.

For example, if a user enters a search for "Primary Election 2008" then the user will obtain the tag cloud 630 having one or more user assigned words 660 and a list of webpages 645. The user may choose any of the words 660 in the tag cloud 630 to focus the search results. Perhaps the user really wanted to find webpages within the collaborative website that focus on presidential elections. Therefore, instead of entering a new search query, the user can select the hyperlinked "President" word 660 in the tag cloud 630. Based on this selection, embodiments will focus the search results to those webpages that have been described by users within an online community as relating to "Primary Election 2008" and "President". This may result in a new tag cloud 630 being generated and presented to the user, wherein the new tag cloud 630 contains one or more hyperlinked words that have been used to describe a webpage by members of the online community. Each of the hyperlinked words are portrayed in the tag cloud according to a score/weight, wherein the higher the word's score, the more important or predominate the word appears in the tag cloud. In addition to the tag cloud 630, a new list of webpages 645 may also be presented to the user.

The result of a user selecting the word 660 "President" from the tag cloud 630 can be illustrated in FIG. 8, wherein a new tag cloud 730 is generated and includes the most popular words, e.g. those words with the highest score/weight, given the user's focus on the word "President". In this example, the user's decision to focus on the word "President" resulted in some new words in the tag cloud, which including "Washington", "Capital", and "White House". Additionally, the focus also resulted in a new list of webpages 745 that can be chosen by the user. The user may continue to refine the search query by selecting another word, which generates new search results and the new tag cloud 730. This may be done as many times as the user desires. Additionally, in embodiments, the user may also be allowed to go back to previous searches result and refine a search.

Embodiments may also include changes to the GUI itself. For example, a user's choice of a word in the tag cloud 730 may be added to a user' search query. Additionally, the GUI may display the tag cloud 730 on the bottom of the page, as a side bar, in a different shape, etc. Embodiments may also allow the user to move the tag cloud 730 around the webpage or even display the tag cloud 730 in another window, such as a pop-up window. Additionally, the tag cloud 730 may be continually displayed to a user while looking at a webpage and may be immediately displayable to users as they read or edit webpages.

Additional Embodiments

A number of different types of collaborative websites, such as wikis, may be used in the present invention. Therefore, embodiments may create these collaborative websites using a number of programming language (such as Perl) which have a small footprint, i.e., uses only a small amount of main memory while running. Embodiments may also use a HTTP server, instead of requiring Java® and/or portlets. (Java is a registered trademark of Sun Microsystems Incorporated, in the U.S. and throughout the world.) For example, an embodiment may use a script-based wiki, like USeModWiki in Perl, running on a simple HTTP server (e.g., IBM® Httpd or Apache™). (IBM is a registered trademark of International Business Machines Corporation, in the U.S. and throughout the world. Apache is a trademark of Apache Software Foundation, in the U.S. and throughout the world.)

Embodiment may also track user interest in one or more documents within a collaborative website. This may be done, for example, by using an access log from an IBM Httpd or Apache™ server. Additionally, embodiments may permit the popularity of one or more words in an online community to be tracked and stored within a database or other storage medium.

It should be understood that, while the above invention is described using webpages within a collaborative website, the invention is not limited to webpages and may include any number of document formats that are not written in Hyper-Text Markup Language (HTML). Additionally, while the invention has been described in terms of embodiments, those skilled in the art will recognize that the invention can be practiced with modifications and in the spirit and scope of the appended claims.

What is claimed is:

1. A system comprising:
   a search engine structured to search metadata in each webpage of a plurality of webpages within a collaborative website based on at least one search term input into the search engine, wherein the collaborative website is a wiki and the metadata comprises a plurality of words that represent each webpage;
   a score weighing component configured to:
      determine a parsing relevance factor for each said webpage based on a number of occurrences in the metadata for one or more words of the plurality of words, wherein the one or more words are associated with the plurality of webpages and are related to the at least one search term entered into the search engine;

score each said webpage based on importance or popularity of each said webpage to the collaborative website community; and determine an aggregate score for the at least one search term based on the score and the parsing relevance factor;

a tag cloud generator configured to produce a tag cloud based on results of the search engine and the aggregate score, wherein the tag cloud includes the one or more words of the plurality of words associated with the plurality of webpages with one or more documents and that are related to the at least one search term entered into the search engine; and at least one computing device comprising a processor that executes the search engine and the tag cloud generator, wherein a list of webpages relevant to the at least one search term are displayed simultaneously with the tag cloud in a graphical user interface.

2. The system of claim 1, wherein the one or more words are one or more of weighted and scored according to one or more of a click through rate, a number of times referenced, and a relevance of the one or more documents associated with the one or more words.

3. The system of claim 1, wherein the tag cloud is generated from the one or more words having preexisting online community scores.

4. The system of claim 1, wherein the one or more words in the tag cloud are hyperlinks.

5. The system of claim 1, wherein the one or more words are visually distinguishable based on a weight or a score.

6. The system of claim 1, wherein the one or more words are structured to be any one or more of added to, deleted, and edited by the users.

7. A method for searching comprising:

receiving a search criteria from a user, wherein the search criteria comprising at least one search term;

searching metadata in each webpage of a plurality of webpages within a collaborative website based on the at least one search term, wherein the collaborative website is a wiki and the metadata comprises a plurality of words provided by users of the collaborative website that represent each webpage;

determining a parsing relevance factor for each said webpage based on a number of occurrences in the metadata for one or more words of the plurality of words, wherein the one or more words are associated with the plurality of webpages and are related to the at least one search term;

scoring one or more webpages of the plurality of webpages within the collaborative website based on the search criteria and importance or popularity of the one or more webpages to the collaborative website;

determining an aggregate score for the at least one search term based on the scoring the one or more webpages and the parsing relevance factor;

displaying a list of the one or more webpages in a graphical user interface according to the scoring the one or more webpages;

generating a tag cloud based on results of the search, wherein the tag cloud includes the one or more words of the plurality of words associated with the plurality of webpages and that are related to the search criteria; and displaying the one or more words of the plurality of words via the tag cloud in the graphical user interface according to the aggregate score, wherein:

the list of the one or more webpages is displayed simultaneously with the tag cloud in the graphical user interface; and the receiving the search criteria, the scoring the one or more webpages, and the determining the aggregate score are performed using a computing device including a processor.

8. The method for searching of claim 7, wherein the one or more words in the tag cloud further include one or more links to one or more documents.

9. The method for searching of claim 7, wherein the one or more words in the tag cloud are scored according to a combination of: (i) a click through rate comprising a number of times webpages containing the one or more words have been accessed, (ii) a number of times the webpages containing the one or more words have been linked to, and (iii) a parsing relevance based on how relevant the webpages containing the one or more words are to the search criteria.

10. The method for searching of claim 7, further comprising adjusting the visual appearance of the one or more words in the tag cloud according to the aggregate score.

11. The method for searching of claim 7, further comprising allowing the users to do any one or more of add, delete, and modify the one or more words.

12. The method for searching of claim 7, further comprising tracking a user's interest in the one or more webpages.

13. A computer program product comprising a computer program code stored in a memory, the computer program product includes at least one component to:

search metadata of a plurality of webpages of a collaborative website community that is a wiki with at least one search term in order to obtain a subset of the plurality of webpages that relate to the at least one search term;

parse the metadata of each of the webpages to obtain one or more words that are related to the at least one search term and to determine a number of times each of the one or more words occurs in the metadata of each of the webpages, wherein the one or more words have been associated with the metadata of each of the web pages according to members of the collaborative website community;

determine a parsing relevance factor for each of the web pages based on the number of occurrences in the metadata for each of the one or more words that is related to the at least one search term;

score each of the webpages based on importance or popularity of the webpage to the collaborative website community;

determine an aggregate score for the at least one search term based on the score and the parsing relevance factor;

generate a tag cloud based the one or more words obtained from the parsing of the metadata, wherein the tag cloud includes the one or more words associated with the subset of the plurality of webpages and that are related to the at least one search term;

display the one or more words in a tag cloud;

visually adjust the one or more words according to the aggregate score; and refresh the tag cloud when a webpage of the subset of the plurality of webpages refreshes, wherein the subset of the plurality of webpages relevant to the at least one search term is displayed as a list simultaneously with the tag cloud in a graphical user interface.

14. The computer program product of claim 13, wherein the one or more words are weighted or scored according to any one or more of a click through rate and a number of times referenced, and the score is added to the aggregate score.

15. The computer program product of claim 13, wherein the at least one search term is visually differ in size, color, or font.

16. A method for deploying an application for web searching, comprising:
 providing a computer infrastructure being operable to:
  search metadata in each webpage of a plurality of webpages within a collaborative website based on at least one search term input into a search engine, wherein the collaborative website is a wiki and the metadata comprises a plurality of words provided by users of the collaborative website that represent each webpage;
  generate a tag cloud based on results of the search engine, the tag cloud includes one or more words of the plurality of words associated with the plurality of webpages and that are related to the at least one search term entered into the search en line, wherein the one or more words of the plurality of words are configured to be weighted or scored according to importance to the users of the collaborative website; and
  display the one or more words in the tag cloud based on an aggregate word score,
  wherein the aggregate word score of the one or more words in the tag cloud is calculated by:
   parsing the metadata of the plurality of webpages to obtain a subset of the plurality of words that are related to the at least one search term,
   determining a number of times each word in the subset occurs in the plurality of webpages, and scoring each webpage based on the number of occurrences in each webpage for each word that is related to the at least one search term,
   scoring each webpage based on a click through rate comprising a number of times each webpage containing each word that is related to the at least one search term has been accessed,
   scoring each webpage based on a number of times each webpage containing each word that is related to the at least one search term has been linked to,
   determining a final score for each webpage containing each word that is related to the at least one search term based on the score based on the parsing, the score based on the click through rate and the score based on the number of times the webpage has been linked to, and
   determining an aggregate word score for each word that is related the at least one search term based on the final score for each webpage containing each word that is related to the at least one search term; and
  wherein each webpage containing each word that is related to the at least one search term is displayed in a list simultaneously with the tag cloud in a graphical user interface.

17. The method for deploying an application for web searching of claim 16, further operable to track a user's interest in the plurality of webpages.

18. The method of claim 16, wherein a service provider at least one of creates, maintains, deploys and supports the computer infrastructure.

19. The method of claim 16, wherein the collaborative website is a wiki and the computer infrastructure is further configured to:
 refresh the tag cloud when the each webpage containing the each word that is related to the at least one search term refreshes.

20. The method of claim 16, wherein the display of the at least one search term in the tag cloud based on the aggregate word score visual portrays a rank of how important the at least one search term is to the collaborative website.

21. The method of claim 7, further comprising parsing the metadata of each webpage of the plurality of webpages to obtain the one or more words that are related to the at least one search term and to determine the number of times each of the one or more words occurs in the metadata of each of the webpages.

22. The method of claim 16, wherein the search only searches the metadata comprising the plurality of words provided by the users of the collaborative website that represent each webpage.

23. A computer system for searching a collaborative website, the system comprising:
 a CPU, a computer readable memory and a computer readable storage media;
 first program instructions to search metadata in each webpage of a plurality of webpages within the collaborative website based on at least one search term input into a search engine, wherein the collaborative website is a wiki and the metadata comprises a plurality of words provided by users of the collaborative website that represent each webpage;
 second program instructions to parse the metadata of the plurality of webpages to obtain a subset of the plurality of words that are related to the at least one search term;
 third program instructions to determine a number of times each word in the subset occurs in the plurality of webpages, and scoring each webpage based on the number of occurrences in each webpage for each word that is related to the at least one search term;
 fourth program instructions to score each webpage based on a click through rate comprising a number of times each webpage containing each word that is related to the at least one search term has been accessed;
 fifth program instructions to score each webpage based on a number of times each webpage containing each word that is related to the at least one search term has been linked to;
 sixth program instructions to determine a final score for each webpage containing each word that is related to the at least one search term based on the score based on the parsing, the score based on the click through rate and the score based on the number of times the webpage has been linked to;
 seventh program instructions to determine an aggregate word score for each word that is related the at least one search term based on the final score for each webpage containing each word that is related to the at least one search term;
 eighth program instructions to generate a tag cloud based on results of the search, wherein the tag cloud includes one or more words of each word that is related the at least one search term; and
 ninth program instructions to display the one or more words of each word that is related the at least one search term in the tag cloud based on the aggregate word score,
 wherein:
 the search only searches the metadata comprising the plurality of words provided by the users of the collaborative website that represent each webpage;
 each webpage containing each word that is related to the at least one search term is displayed in a list simultaneously with the tag cloud in a graphical user interface; and
 the first through ninth program instructions are stored on the computer readable storage media for execution by the CPU via the computer readable memory.

* * * * *